United States Patent
Minemura et al.

(10) Patent No.: US 7,616,726 B2
(45) Date of Patent: Nov. 10, 2009

(54) OPTICAL DISK APPARATUS AND PLL CIRCUIT

(75) Inventors: Hiroyuki Minemura, Kokubunji (JP); Atsushi Kikugawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 599 days.

(21) Appl. No.: 11/237,753

(22) Filed: Sep. 29, 2005

(65) Prior Publication Data
US 2006/0203949 A1    Sep. 14, 2006

(30) Foreign Application Priority Data
Mar. 11, 2005  (JP) .............................. 2005-068341

(51) Int. Cl.
*H03D 3/24* (2006.01)
(52) U.S. Cl. .................. 375/376; 375/340; 327/156
(58) Field of Classification Search ......... 375/375–376, 375/371, 340–341, 373, 327; 720/718, 725; 327/156
See application file for complete search history.

(56) References Cited

U.S. PATENT DOCUMENTS

| | | | | |
|---|---|---|---|---|
| 4,853,642 | A * | 8/1989 | Otani et al. ................. | 329/306 |
| 5,119,243 | A * | 6/1992 | Shimazaki et al. ............ | 360/46 |
| 5,805,024 | A * | 9/1998 | Takashi et al. ................ | 331/17 |
| 6,003,051 | A | 12/1999 | Okazaki | |
| 6,683,920 | B1 * | 1/2004 | Coy ............................ | 375/326 |
| 6,703,877 | B2 * | 3/2004 | Kobayashi et al. .......... | 327/156 |
| 6,788,484 | B2 | 9/2004 | Honma | |
| 6,831,884 | B2 * | 12/2004 | Hamada et al. .......... | 369/47.28 |
| 6,873,668 | B2 | 3/2005 | Yamamoto et al. | |
| 6,934,328 | B1 * | 8/2005 | Halder ........................ | 375/232 |
| 7,123,560 | B2 * | 10/2006 | Tonami .................... | 369/47.35 |
| 7,177,362 | B2 * | 2/2007 | Chang et al. ................. | 375/259 |
| 2002/0061088 | A1 | 5/2002 | Kon | |
| 2002/0071502 | A1 * | 6/2002 | Chan et al. .................. | 375/326 |
| 2002/0176200 | A1 * | 11/2002 | Trivedi ..................... | 360/77.12 |
| 2004/0027157 | A1 * | 2/2004 | Hirota et al. .................. | 326/66 |
| 2004/0076245 | A1 * | 4/2004 | Okamoto et al. ............ | 375/341 |
| 2004/0137858 | A1 * | 7/2004 | Corse et al. ................. | 455/102 |
| 2005/0141370 | A1 * | 6/2005 | Yamakawa et al. ....... | 369/47.17 |
| 2006/0069945 | A1 * | 3/2006 | Takashi et al. ................. | 714/5 |
| 2006/0181797 | A1 * | 8/2006 | Sugawara et al. ............. | 360/51 |
| 2006/0280092 | A1 * | 12/2006 | Tonami ................... | 369/59.21 |

FOREIGN PATENT DOCUMENTS

| | | |
|---|---|---|
| JP | 10-172250 | 6/1998 |
| JP | 11-185386 | 7/1999 |
| JP | 11-296987 | 10/1999 |
| JP | 2000-182335 | 6/2000 |
| JP | 2002-25202 | 1/2002 |
| JP | 2002-74859 | 3/2002 |
| JP | 2002-117631 | 4/2002 |
| JP | 2002-175673 | 6/2002 |

* cited by examiner

*Primary Examiner*—Jean B Corrielus
(74) *Attorney, Agent, or Firm*—Antonelli, Terry, Stout & Kraus, LLP.

(57) ABSTRACT

With the objective of providing a stable PLL circuit and improving readout performance of an optical disk apparatus equipped with PRML, using the PLL circuit, phase detectors are respectively provided with respect to signals prior and subsequent to an FIR filter, and the phase detectors are selectively used according to an operating condition of a PLL to thereby stabilize the operation of the PLL circuit. There can be provided such an optical disk apparatus that readout performance is improved so as to extract an operating limit of a Viterbi decoder.

9 Claims, 16 Drawing Sheets

TAP LAYOUT

CASE-1

| -7.5 | -6.5 | -5.5 | -4.5 | -3.5 | -2.5 | -1.5 | -0.5 | +0.5 | +1.5 | +2.5 | +3.5 | +4.5 | +5.5 | +6.5 | +7.5 |
|---|---|---|---|---|---|---|---|---|---|---|---|---|---|---|---|
|  |  |  |  |  | O |  | O | O |  | O |  |  |  |  |  |

CASE-2

| -7.5 | -6.5 | -5.5 | -4.5 | -3.5 | -2.5 | -1.5 | -0.5 | +0.5 | +1.5 | +2.5 | +3.5 | +4.5 | +5.5 | +6.5 | +7.5 |
|---|---|---|---|---|---|---|---|---|---|---|---|---|---|---|---|
|  | O |  | O |  | O |  |  | O | O |  | O |  | O |  | O |

CASE-3

| -7.5 | -6.5 | -5.5 | -4.5 | -3.5 | -2.5 | -1.5 | -0.5 | +0.5 | +1.5 | +2.5 | +3.5 | +4.5 | +5.5 | +6.5 | +7.5 |
|---|---|---|---|---|---|---|---|---|---|---|---|---|---|---|---|
|  | O |  | O |  |  | O | O | O | O | O | O |  | O |  | O |

CASE-4

| -7.5 | -6.5 | -5.5 | -4.5 | -3.5 | -2.5 | -1.5 | -0.5 | +0.5 | +1.5 | +2.5 | +3.5 | +4.5 | +5.5 | +6.5 | +7.5 |
|---|---|---|---|---|---|---|---|---|---|---|---|---|---|---|---|
|  | O | O | O |  |  |  |  | O | O |  |  |  | O | O | O |

CASE-5

| -8.5 | -7.5 | -6.5 | -5.5 | -4.5 | -3.5 | -2.5 | -1.5 | -0.5 | +0.5 | +1.5 | +2.5 | +3.5 | +4.5 | +5.5 | +6.5 | +7.5 | +8.5 |
|---|---|---|---|---|---|---|---|---|---|---|---|---|---|---|---|---|---|
| O |  | O |  | O |  | O |  | O | O |  | O |  | O |  | O |  | O |

INPUT SIGNAL OF FIR FILTER → OUTPUT SIGNAL OF FIR FILTER

INPUT SIGNAL OF FIR FILTER          OUTPUT SIGNAL OF FIR FILTER

FIG. 19
CASE 1:EDGE POINT = CLOCK POINT
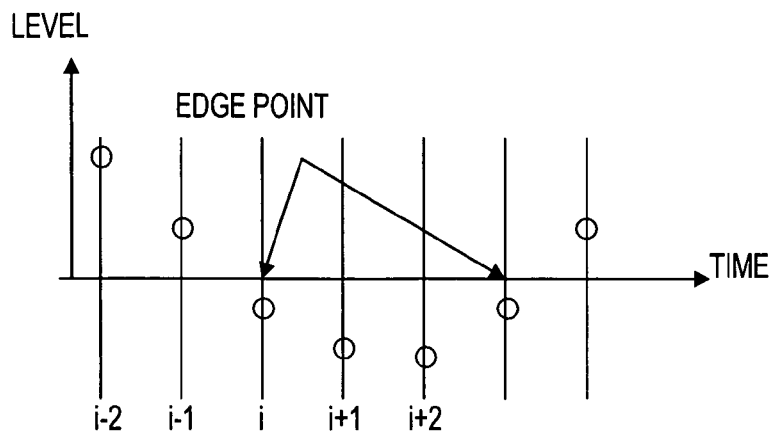
EDGE CONDITION:
$$y[i-1] \cdot y[i+1] < 0;$$
PHASE ERROR (LEVEL ERROR):
$$y[i]$$
CASE EDGE POINT≠CLOCK POINT
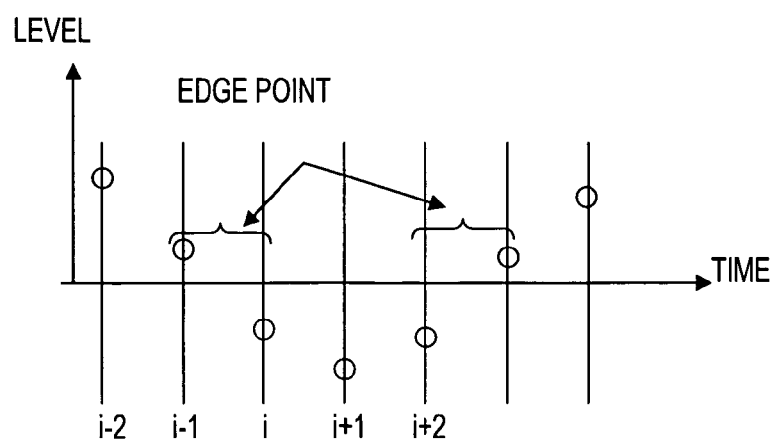
EDGE CONDITION:
$$y[i-1] \cdot y[i+1] < 0;$$
PHASE ERROR (LEVEL ERROR):
$$(y[i]+y[i-1])/2$$

an optical disk apparatus and a PLL circuit used therein.

OPTICAL DISK APPARATUS AND PLL CIRCUIT

CLAIM OF PRIORITY

The present application claims priority from Japanese application JP 2005-068341 filed on Mar. 11, 2005, the content of which is hereby incorporated by reference into this application.

CROSS REFERENCE TO RELATED APPLICATION

U.S. patent application Ser. No. 11/092,872 is a co-pending application of this application. The content of which is incorporated herein by cross-reference.

FIELD OF THE INVENTION

The present invention relates to an optical disk apparatus which forms recording marks different in physical property from other portions on a recording medium and records or plays back information, and a PLL circuit used therein.

BACKGROUND OF THE INVENTION

CDs and DVDs are prevalent as optical disks. The development of a next-generation optical disk using blue laser has been advanced. A further increase in capacity has been required continuously. Super multidrive having the function of performing not only playback of a CD by one optical disk apparatus but also playback of a CD and a DVD and performing recording for CD-R/RW, DVD-RAM, and DVD-R/RW disks has been commercialized. This has been considered to become a predominant product.

Since a PRML (Partial Response Maximum Likelihood) method is excellent in improvement effect of an S/N ratio, it has been in widespread use as a means for bringing a magnetic disk into a great increase in capacity. The PRML method is a decoding technique which compares N consecutive signal samples with the target signal and decode to a most likelihood bit stream. Viterbi decoding method, which is one ML method, has been brought into wide practical use, because it can greatly reduce the circuit scale. Although a direct slice method has been used as a method for reproducing or playing back an optical disk from long ago, there appears to be a limit to speeding up and an increase in capacity. Therefore, the PRML method is being also applied for optical disk playback means.

With the PRML method intended for the optical disk as one example, a technique for allowing a target signal level of a Viterbi decoder to adaptively follow the level of a readout signal so as to match the level of the readout signal has been disclosed in JP-A No. 296987/1999 (Patent Document 1). FIG. 2 shows the construction of the Viterbi decoder capable of setting target levels. The Viterbi decoder 40 comprises a BR unit 41, an ACS (Add Compare Select) unit 42, a path memory 43, a target level table 44, and a target study unit 45. An EQ wave 53 subjected to equalization processing is inputted to the BR unit 41, where a branch metric value relative to a target level is calculated for each bit string. At this time, the target level is instructed from the target level table 44. The ACS unit 42 adds the branch metric values corresponding to the respective bit strings to state metric values (ones obtained by sequentially adding the branch metric values with the transition of states and processed so as not to cause their diversion) at a state at the instant preceding one time and respective states. Here, one is selected from the transition processes lasting to the present time whose state metric is smaller. (the number of the transitions processes is normally two or might be one depending upon run-length restriction). The term state means a bit string stored with respect to the transition of one time. When a PR class with a constraint length is 4 is taken, for example, the bit string is expressed in 4 bits and the state is expressed in 3 bits. Binalized results or outputs have been stored in the path memory 43 for a sufficient long time. Upon selecting the transition processes with smaller state metric, the ACS unit 42 rearranges the information stored in the path memory according to the result of selection of each state metric value. With repetition of such processing, the information stored in the path memory are gradually integrated so that so-called path merge is completed in which they reach the same value without depending upon the bit strings after the passage of a sufficient long time. A binary output 51 is binary information taken out from the termination of the path memory for each time. The target study unit 45 has the function of extracting a bit string from the binary output 51 whose length is equal to the constraint length, averaging the EQ wave 53 by every bit strings and updating each target level stored in the target level table 44. The target level table 44 also includes the function of setting target level values for each bit strings in advance in response to a pre-set value load command 56 issued from a CPU.

An AD converter mentioned above performs conversion to a digital signal string in sync with a clock signal generated from a readout signal by using a PLL (Phase Locked Loop) circuit. Thus, the generation of a stable clock from a PLL is a prerequisite for carrying out stable binarization in the PRML method.

As one example of a next-generation optical disk using blue laser, one having a memory capacity of 23.3 GB/25 GB as a Blue-ray Disc recorder has been commercialized. Its further increase in capacity in future is expected. An optical disk apparatus compatible with a Blu-ray Disc and an optical disk apparatus with increased capacity may face problems such as degradation of the precision of a clock generated by a PLL and an inability to make a proper edge decision where the amplitude of the shortest run-length signal is significantly reduced.

As a technique for solving instability of the PLL due to the reduction in the amplitude of the shortest run-length signal, there has been known a method for inserting means for pre-decoding stage prior to the PLL as disclosed in each of JP-A No. 175673/2002 (corresponding U.S. Pat. No. 6,788,484/Patent Document 2) and JP-A 172250/1998 (Patent Document 3). As disclosed in JP-A No. 182335/2000 (Patent Document 4), there has also been known a method for performing phase detection at other target level other than a zero level.

SUMMARY OF THE INVENTION

However, the methods described in JP-A No. 175673/2002 and JP-A No. 172250/1998 are respectively accompanied by new problems that the scale of a circuit which is complex and needs a high-speed operation, becomes large, and a phase margin at the pull-in operation of the PLL is narrowed due to a delay produced at the corresponding portion. Further, the system described in JP-A 182335/2000 is also accompanied by a problem that a circuit scale increases to adapt to a plurality of optical disks such as a CD, a DVD, and a Blue-ray Disc different in characteristic of a readout signal.

The stable operation of the PLL is indispensable to realize satisfactory playback by the optical disk apparatus using the PRML method as described above. Since, however, the delay of the circuit increases and the circuit scale becomes large, the conventional PLL stabilizing method is susceptible to improvement.

The objective of the present invention is to provide an optical disk apparatus equipped with PRML decoder, whose PLL circuit is stable, thereby realize satisfactory playback performance. Incidentally, since the present invention brings forward a main point with the focus on a readout signal in which the shortest run length employed in a Blue-ray Disc is 2T, the shortest run length is assumed to be 2T unless otherwise specified. Since the present invention is mainly intended for a signal subsequent to AD conversion, it indicates data subsequent to AD conversion below unless otherwise specified, where the signal is expressed simply as a readout signal or the like. However, the present invention is not limited to it where it is definite contextually.

A condition for a stable operation of a PLL is considered below by conducting a PLL simulation with a readout signal of a Blue-ray Disc as an example, and thereafter means for solving the problems will be summarized. FIG. 3 shows the construction of a playback or readout circuit of a general optical disk. In the figure, an RF input 50 obtained from an optical head is subjected to processes such as AGC, equalization, and low-pass filtering, etc. by using an analog signal processor 10 and thereafter converted to a digital data stream by an AD converter 21. A slicer 22 performs a process for correcting a DC component contained in the RF input 50. Thereafter, an FIR filter 23 filter-processes the RF input. The operation of a Viterbi decoder 40 is as mentioned above. A PLL 30 comprises a phase detector 31, a low-pass filter 33, and a VCO (Voltage Controlled Oscillator) 34. The phase detector 31 compares the phase of an input signal and a clock 52 generated by the VCO 34 and generates a phase error.

FIG. 4 shows the principle of operation of a phase detector of a 3-time system. Here, the term "n-time system" means that it makes use of the values of n times at T intervals inclusive of the present time. Here, T indicates a sampling interval at the ADC, i.e., the inverse of the frequency of a clock. Now consider a readout signal in which both asymmetry and a DC offset are zero. The center value of its envelope will be defined as the reference of a signal level, that is, it will be defined as 0. When y(t) and y(t−2) of a readout signal stream {y(t), y(t−1), y(t−2)} are different in sign from each other in the case of the 3-time system, they cross the zero level. This will be called an "edge". Incidentally, y(n) indicates the value of a readout signal sampled at a time n. Similarly, the case in which y(t) and y(t−1) are different in sign from each other is called an "edge" if a 2-time system is taken. Let us assume that when the clock signal for the PLL and the input signal perfectly coincide in phase with each other, the input signal crosses a zero point at a time (t−1)T as described in the case where the phase difference in the figure is absent. In this case, the values of times tT and (t−2)T in an edge signal string are identical to each other in absolute value and different in sign from each other. Let us now consider that their values are {−1, 0, 1}. Assuming that the phase of the clock signal leads, i.e., the phase of the input signal is delayed ΔT in time with respect to the clock signal, the input signal draws loci indicated by solid lines in the figure. When the loci are sampled by the AD converter at respective times, the absolute values of their values at the times tT and (t−2)T are different from each other as in the case of {−0.7, 0.3, 1.3} if illustrated by way of example in the figure. The difference in phase between the readout signal and the clock can be detected using the values of respective points relative to the edge in reverse. If a decision as to whether the edge is an ascending edge or a descending edge, is added to it, then a value φ proportional to the phase difference can be obtained. It can be determined by, for example, (the following equation 1) if the 3-time system is taken:

$$\Phi = Sgn(y(t))\{y(t)+y(t-1)+y(t-2)\} \quad (1)$$

In the case of the 2-time system, it can be determined by (the following equation 2) in like manner:

$$\Phi = Sgn(y(t))\{y(t)+y(t-1)\} \quad (2)$$

where Sgn (y) is expressed as follows:

$$Sgn(y) = \begin{cases} 1 & (y > 0) \\ 0 & (y = 0) \\ -1 & (y < 0) \end{cases} \quad (3)$$

The detection of the edge is carried out by monitoring sign transitions of sample values between two times or three times.

When the phase difference is detected by such a system, problems such as degradation of clock precision, an inability to make a proper edge decision, etc. occur where as described above, the amplitude (resolution) of the shortest run length signal is significantly reduced with an increase in recording density, and a jitter value becomes large due to the influence of amplifier noise or the like by making a playback speed faster.

An equalization condition of the analog signal processor for the stable operation of the PLL will first be discussed. A seventh-order equi-ripple filter widely known as an analog equalizer was used here. Although its details are not shown because of its cumbersomeness, the equalization characteristic of the seventh-order equi-ripple filter is generally determined depending upon a boost amount Fb and a cutoff frequency Fc of a low-pass filter. FIG. 5 shows the result of obtaining the equalization condition which minimizes the jitter of a readout signal of a Blu-ray disc. Considering the stabilization of the PLL the jitter was minimized, thus, Fb=10 dB and Fc=0.27 Fs (where Fs: frequency of PLL clock) were selected as the equalization condition for the analog equalizer.

Next, the relationship between the jitter of the analog equalizer output and the bit error rate is determined when the PR class is PR(1, 2, 2, 1)ML. Here, the FIR filter is through (of a signal therethrough as it is). With high-speed playback as a premise, jitter values of a readout signal were changed by increasing or decreasing amplifier noise. The result thereof is shown in FIG. 6. Generally, in an optical disk system, bit error rate of $10^{-4}$ corresponds to the limit of error correcting capability. Thus, a system using this Viterbi decoder reaches its limit when the jitter of the analog equalizer reaches approximately 30%. In other words, the PLL should stably operate up to jitter of 30% or so. Since jitter 15% or so is of a playback limit where binary processing is generally effected on a DVD or a CD by a direct slice method, a jitter upper limit value for the stable operation of the PLL is raised to about twice in an optical disk using high-density 1-7 modulation like the Blu-ray Disc. This is the reason why the stabilization of the PLL must be realized in the present invention.

FIG. 7 shows the relationship between the phase offset and bit error rate obtained using the same Viterbi decoder as above. That is, the phase error was introduced as an offset value at the Viterbi decoder. The magnitude of amplifier noise were also varied in the simulation. The phase offset should be 0.1 T or less to suppress the increase of the bit error rate due to the phase offset when the PLL instability is assumed as it. This is the restriction condition for the PLL stable operation.

FIG. 8 shows a simulation result of the relationship between the PLL input signal jitter and the RMS phase error. Here, the phase error detector is configured as the 2-time system, and a low-pass filter is configured so as to feed back an integrated value of a suitable phase error to construct a secondary system along with a moving average filter of 256 Tw. Here, the RMS value of the phase error corresponds to the result of calculation of an RMS value corresponding to the difference in phase between an ideal clock and a VCO output clock. It is understood from above consideration that assuming that the upper limit of the RMS value of the phase error is 10%, the upper limit of the jitter value of the input signal is about 22% from the figure.

It was found out from above that the Viterbi decoder reaches its operation limit when the analog equalizer output jitter reaches 30% while the input signal jitter must be 22% or less for the stable operation of the PLL. Thus, it has been found out that in the system in which the output signal of the analog equalizer is basically used as the input signal of the PLL as shown in FIG. 3, the instability of the PLL becomes the bottleneck so that the performance of the Viterbi decoder cannot fully be utilized. The objective of the present invention is quantified, that the phase detector input signal jitter should be reduced by 8% (30% to 22%) or more.

Next, the amount of the jitter value improvement using an FIR filter will be considered. The analog equalizer has the problem that an equalization characteristic cannot be set freely to prevent the occurrence of a group delay. The important needs to set its characteristics to standard equalization characteristic described in a spec or the like to an optical disc of plural standards is another factor that restricts its equalization characteristics when considering its application to the optical disc systems. In general, the FIR filter is used to effect equalization processing on the output signal of the analog equalizer so as to approach the target signal of the Viterbi decoder to thereby obtain satisfactory playback performance. It is needless to say that in order to play back the optical disks different in density such as the CD/DVD/Blue-ray Disc by one drive as described above, the Viterbi decoder of such a type that the target signal level adaptively follows such a readout signal as shown in FIG. 2 so as to match the readout signal is suitable than a Viterbi decoder having a fixed PR class. As well known, the FIR filter is of a digital equalizer and can select a frequency characteristic relatively freely by increasing a tap number. Using such a frequency characteristic also enables a reduction in the jitter value of the readout signal by use of the FIR filter. Thus, if the jitter value of the readout signal is reduced using the FIR filter and used as the input signal to the phase error detector, then the stable operation of the PLL can be realized even if the output jitter of the analog equalizer is large.

It is general that the tap coefficient of the FIR filter is obtained by automatic equalization technology. As one automatic equalization technology, there is a well known method called LSE (Least Square Error) method or LMS (Least Mean Square) method. This is a method for successively updating tap coefficients in such a manner that a square error value of an error between a target signal and an equalization signal reaches the minimum.

A result obtained by determining the relationship between a tap number of an FIR filter and a jitter value of an output signal with a target signal employed in the LSE method as a target signal for PR(1, 2, 2, 1)ML is shown in FIG. 9. Here, the FIR filter has n consecutive taps(with same time intervals), and the input signal jitter was varied by varying the amplifier noise as just as described in FIG. 6. As shown in the figure, it is understood that the output signal jitter decreases as the tap number of the FIR filter increases. As seen from the figure, an improvement in jitter value reaches about 8% in the case of jitter 30% and hence the above target can be attained.

FIG. 10 shows a summary of the values of tap coefficients of the FIR filter at the above result. The values determined here correspond to a summary of ones determined as double-precision real values of floating points obtained by software processing. Upon bringing the circuit into LSI, they may preferably be set as real values (the representation of them in the form of n/512 or the like obtained by dividing an integer n by a fixed value of $2^n$ such as 512 or the like is further efficient) of fixed points from the viewpoint of greater efficiency of a circuit scale and a processing speed.

FIG. 11 shows a summary of frequency characteristics of the FIR filter at the above result. This can easily be calculated by determining impulse responses from respective tap coefficients and Fourier-transforming them to determine frequency characteristics.

From the above examinations, the stability of the PLL can be improved by improving input signal jitter value by using the FIR filter and use it as the input signal of the PLL. The present invention is capable of solving the problem of improving the stability of the PLL and makes it possible to improve playback performance of an optical disk apparatus equipped with PRML.

According to the present invention, a stable PLL circuit can be realized, and an operating limit of a Viterbi decoder can be brought out using the PLL circuit. It is thus possible to provide an optical disk apparatus having satisfactory playback performance.

BRIEF DESCRIPTION OF THE DRAWINGS

FIG. 19 shows the principle of detection of a phase detector;

DETAILED DESCRIPTION OF THE PREFERRED EMBODIMENTS

The details of the present invention will hereinafter be described using preferred embodiments.

First Embodiment

FIR Filter

A description has already been made of the case in which the tap number of the FIR filter is odd. The present embodiment will explain a case in which the tap number is even.

Figure 12:
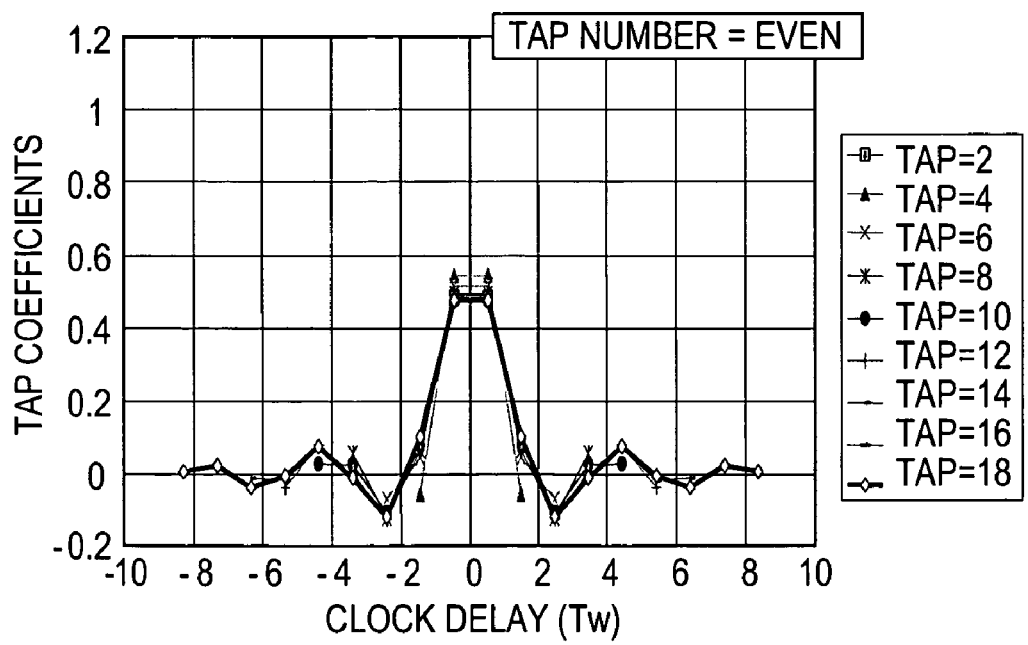
FIG. 12 is a simulation result showing tap coefficients of an FIR filter having an even number of taps.

FIG. 12 shows a summary of the values of tap coefficients where the tap number of the FIR filter is even. Described specifically, target signal levels are calculated from PR(1, 2, 2, 1)ML in the same manner as described above where the tap number is 2, 4, 6, 8, 10, 12, 14, 16, and 18 respectively to thereby determine the values of tap coefficients by the LSE method.

Figure 13:
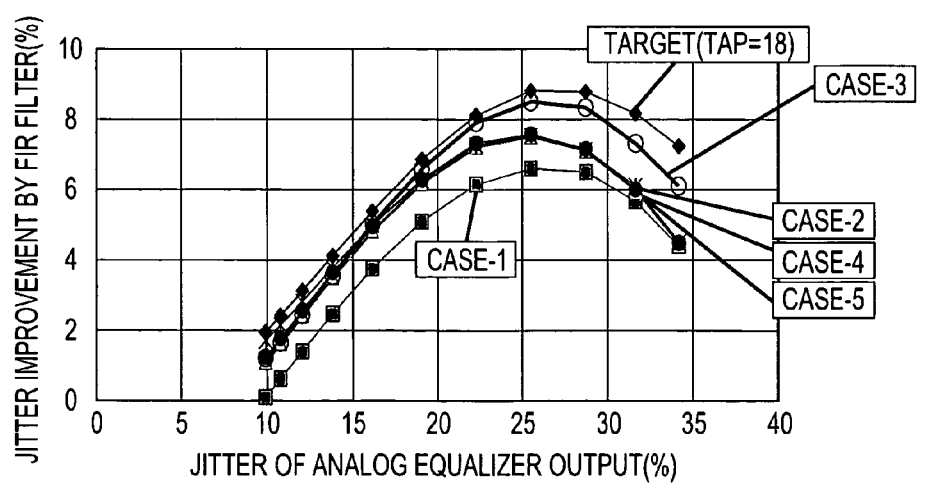
FIG. 13 is a simulation result showing a summary of jitter improvements made for each construction of the FILR filter having the even number of taps.

FIG. 13 shows a result of calculation of jitter improvements by the FIR filter with respect to tap layouts of cases 1 through 5 where the tap number of the FIR filter is even. An advantage is brought about in that even when taps of the FIR filter are not consecutive as shown in the figure, the effect of improving jitter is obtained in like manner and a circuit scale can be brought into less size. With the arrangement of taps on a six consecutive basis from the center as in the case 3, a jitter improvement effect closest to continuous eighteen taps is obtained where the eighteen consecutive taps are defined as ideal performance. This is because a satisfactory low-pass filter can be configured with the six consecutive taps as viewed from the center.

Figure 14:
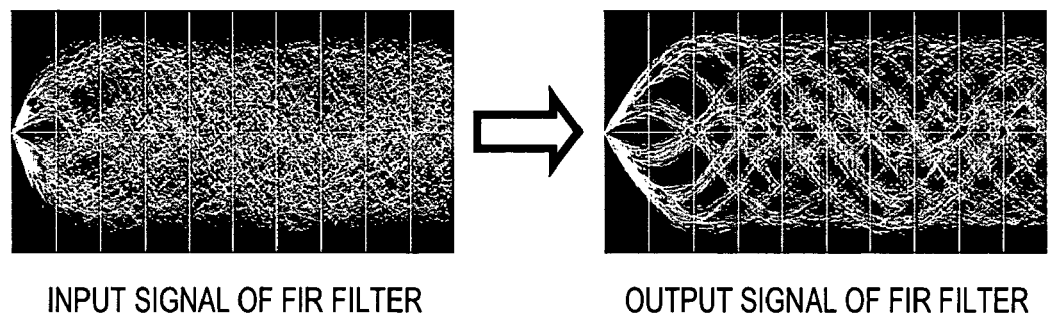
FIG. 14 illustrates the difference between input/output readout signals of the FIR filter.

FIG. 14 shows input and output signals of the FIR filter. Thus, even when the tap number of the FIR filter is even, an improvement in signal quality can be attained.

Figure 15:
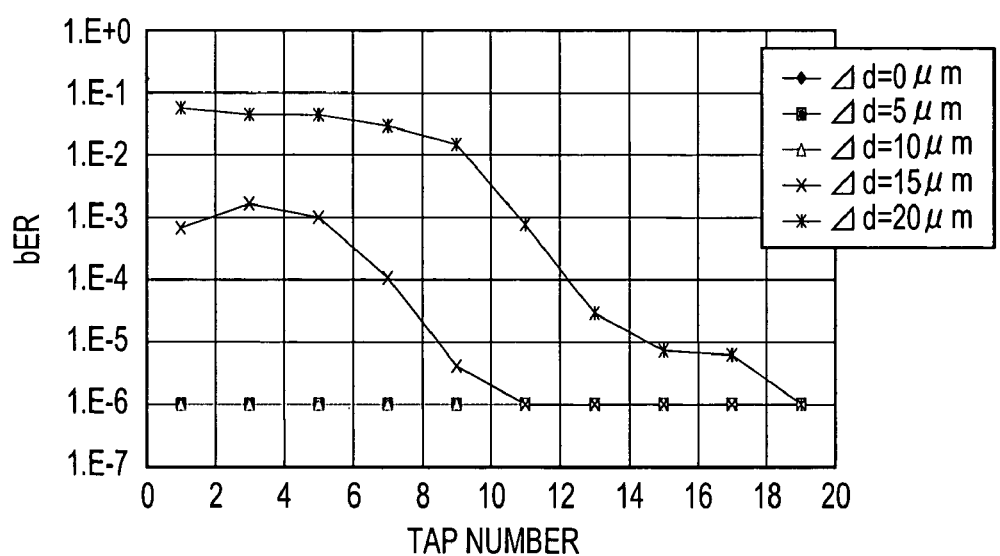
FIG. 15 shows the relationship between a tap number and a bit error rate in the presence of spherical aberration.

A description will next be made of a case in which the thickness of a transparent substrate of an optical disk is shifted from a head design value and spherical aberration occurs. The results of calculation of the relationships between a tap number of the FIR filter and a bit error rate thereof where a shift Δd in substrate thickness is 0 μm, 5 μm, 10 μm, 15 μm, and 20 μm respectively assuming that the wavelength of a head is 405 nm, a numerical aperture is 0.85, and the center value of the substrate thickness of the optical disk is 100 μm, are shown in FIG. 15. It is understood from the figure that the bit error rate increases when Δd exceeds 10 μm, whereas if the tap number of the FIR filter is sufficiently large, then the bit error rate can be improved by correcting distortion in signal generated by the spherical aberration. Similarly, the LSE method was used in study of the respective tap coefficients.

Figure 16:
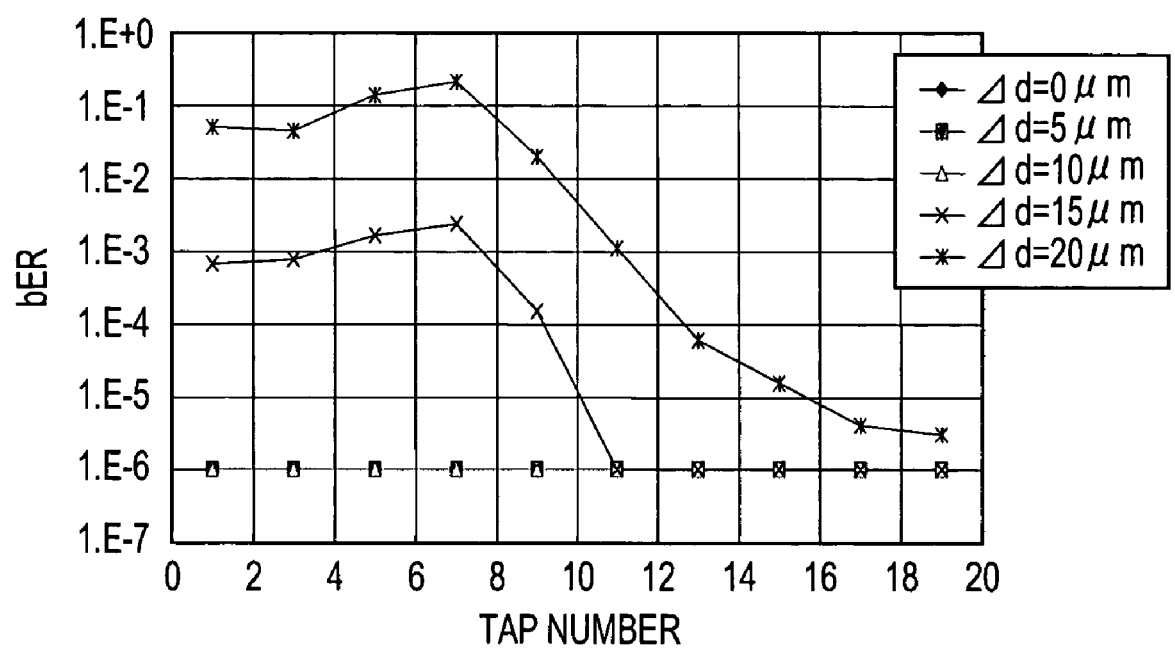
FIG. 16 shows the relationship between a tap number and a bit error rate in the presence of spherical aberration.

FIG. 16 shows the results of calculation of the relationships between a tap number of the FIR filter and its bit error rate where the thickness of the substrate changes in a manner similar to FIG. 15. Here, an edge focus LSE method for determining the edge of a readout signal and performing the process of studying tap coefficients, based on the edge portion alone was used in the study of the respective tap coefficients without using the standard LSE method. Since each target signal level is normally zero in most cases, the advantage of the edge focus LSE method resides in that the edge portion is determined for a PR class and each tap coefficient is updated in such a manner that a signal level thereof approaches zero, whereby the process of calculating the target signal level can be simplified and a circuit scale can be reduced. As seen in the figure, such a method also brings about the effect of improving the bit error rate in like manner.

Figure 17:
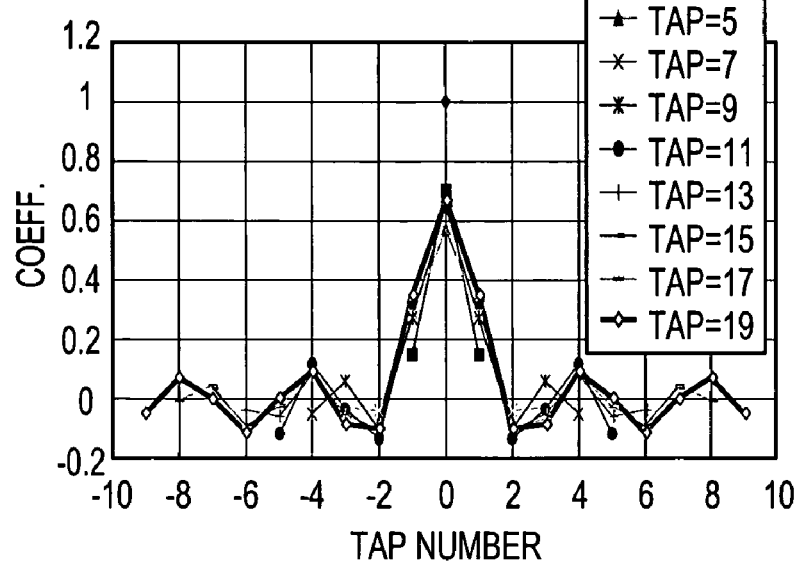
FIG. 17 illustrates tap coefficients of an FIR filter in the presence of spherical aberration.

FIG. 17 shows a summary of tap coefficients of the FIR filter at the results shown in FIG. 15.

Figure 18:
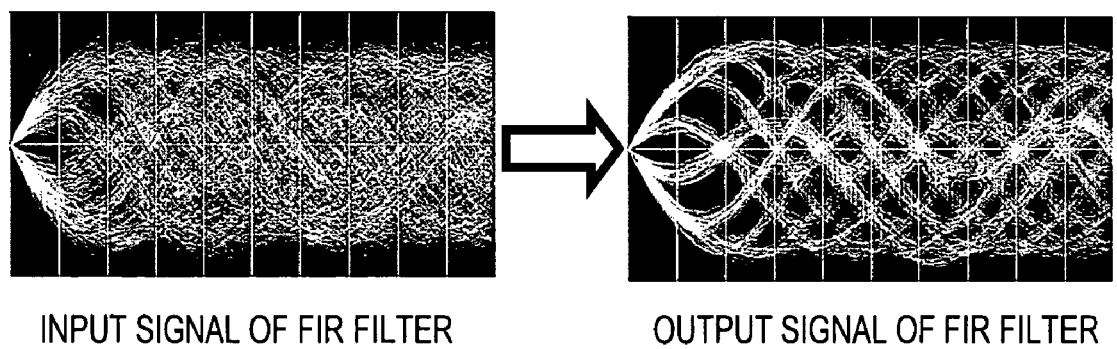
FIG. 18 illustrates the difference between input/output readout signals of the FIR filter in the presence of the spherical aberration.

FIG. 18 shows input and output signals of the FIR filter where a shift in substrate thickness is 20 μm and a tap number is 19 at the results shown in FIG. 15. It is understood that an improvement in signal quality has been achieved by the FIR filter.

Second Embodiment

PLL Circuit and Phase Detectors

Figure 1:
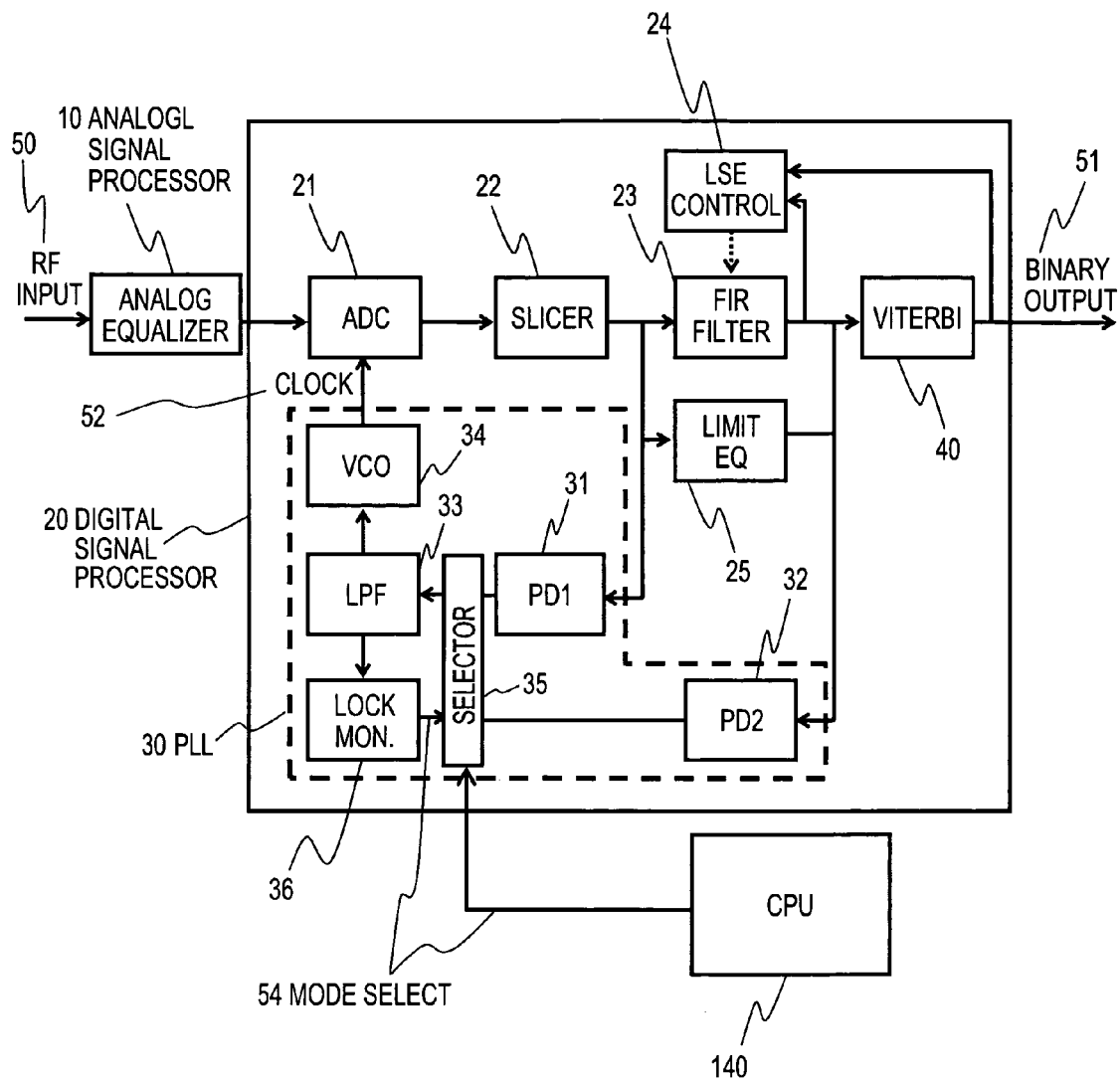
FIG. 1 shows the construction of a readout signal processor of an optical disk apparatus according to the present invention.
Figure 2:
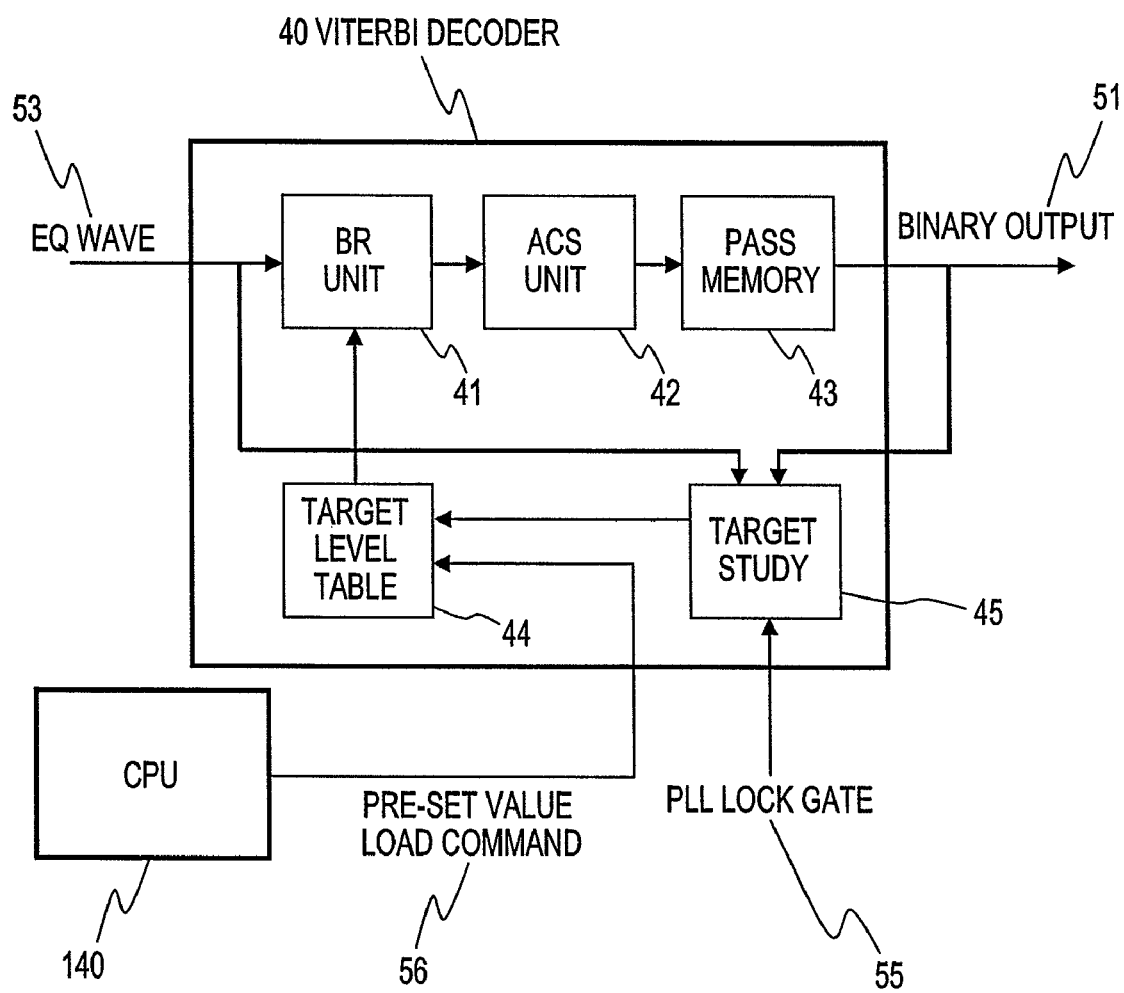
FIG. 2 is a construction diagram of an adaptive PRML.
Figure 3:
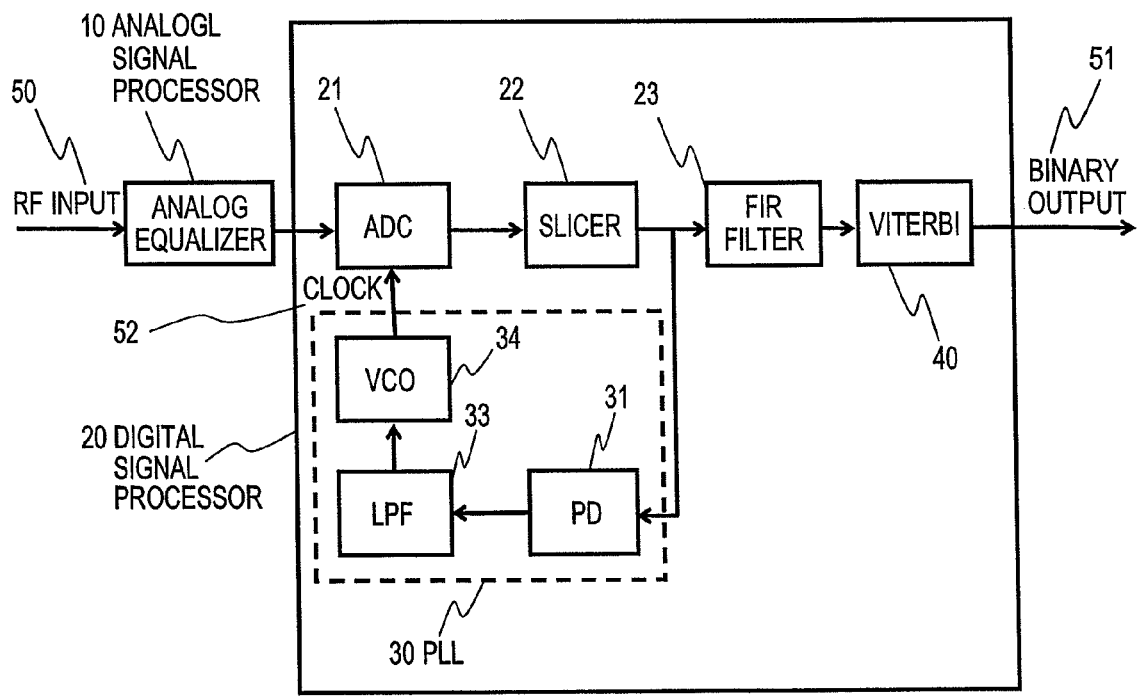
FIG. 3 is a construction diagram of a general readout signal processor.
Figure 4:
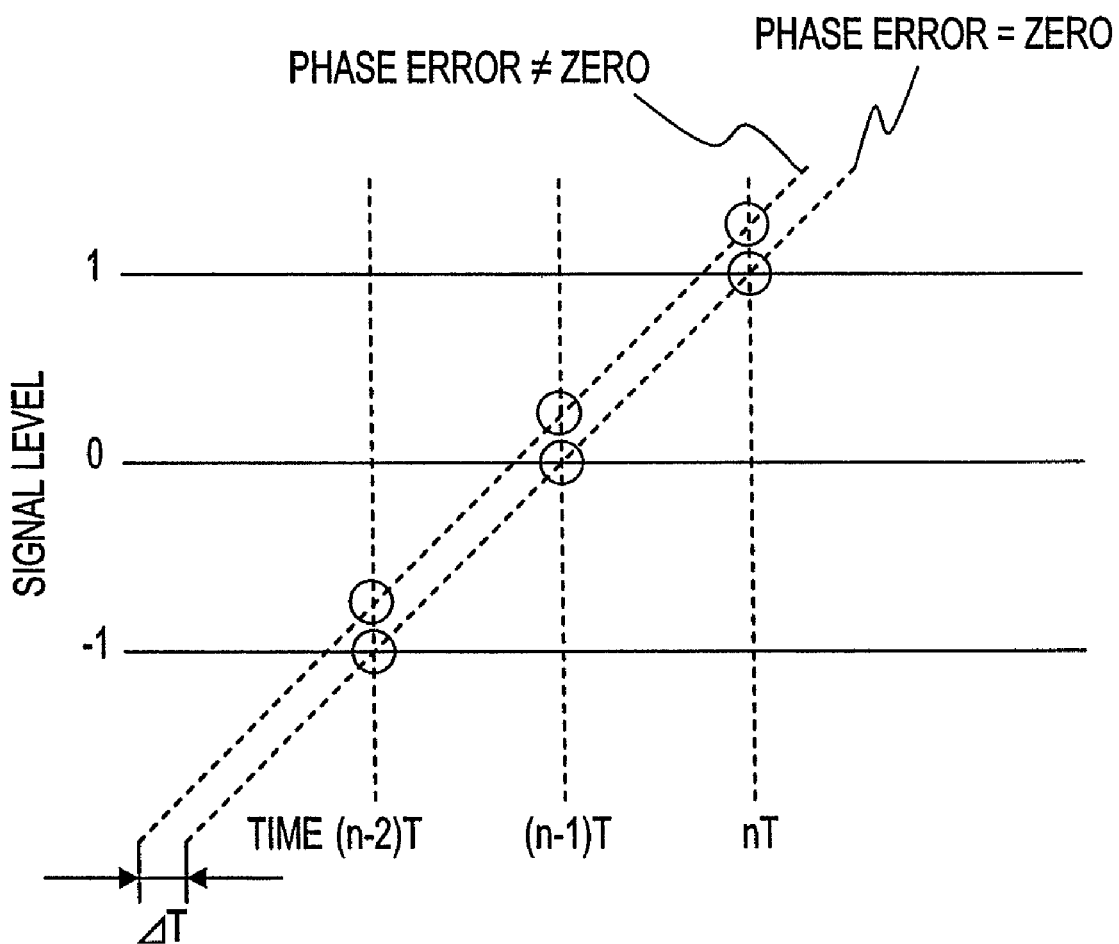
FIG. 4 is a typical diagram showing the principle of detection of each phase error.
Figure 5:
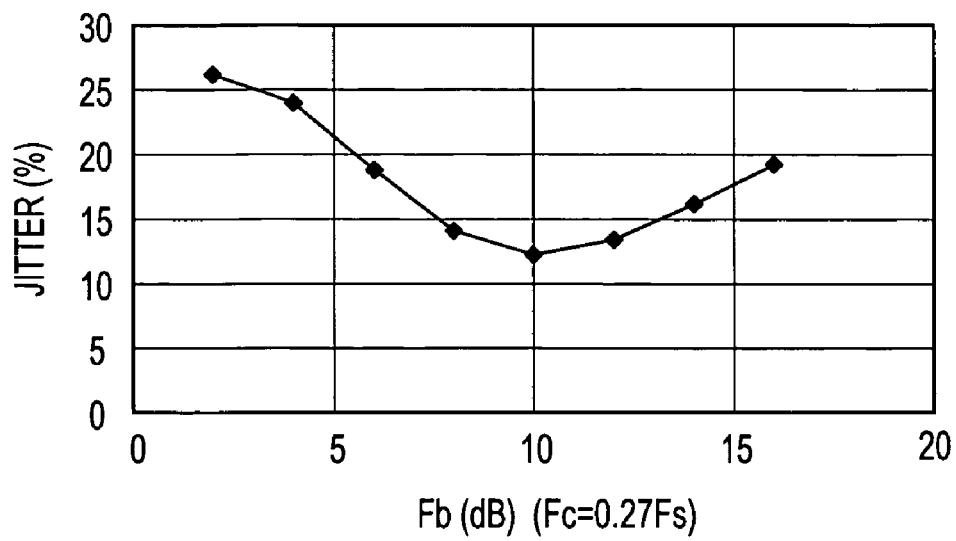
FIG. 5 is a simulation result illustrating an adaptive equalization condition of an analog equalizer.
Figure 6:
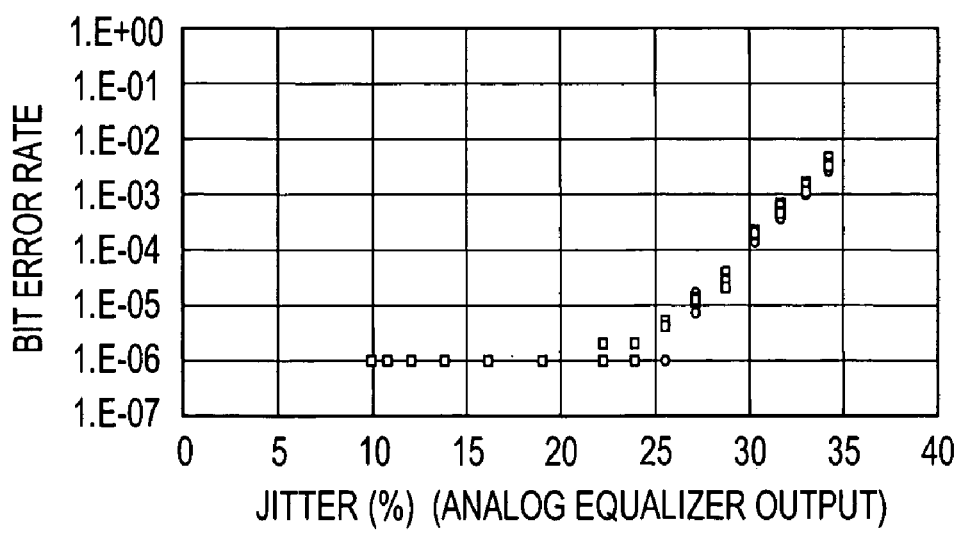
FIG. 6 is a simulation result depicting the relationship between jitter and a bit error rate.
Figure 7:
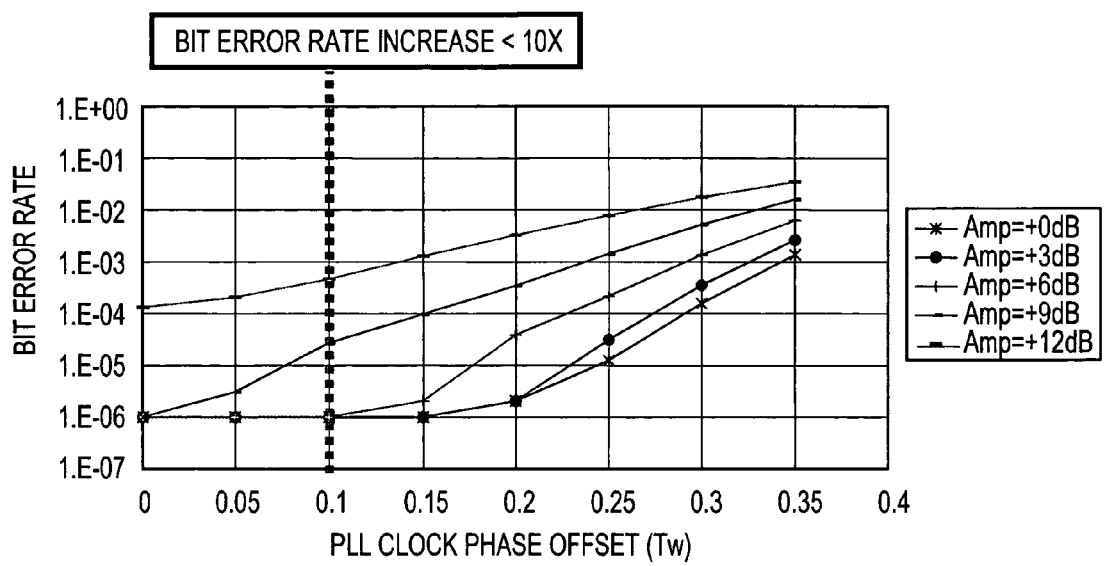
FIG. 7 is a simulation result showing the relationship between a clock phase offset and a bit error rate.
Figure 8:
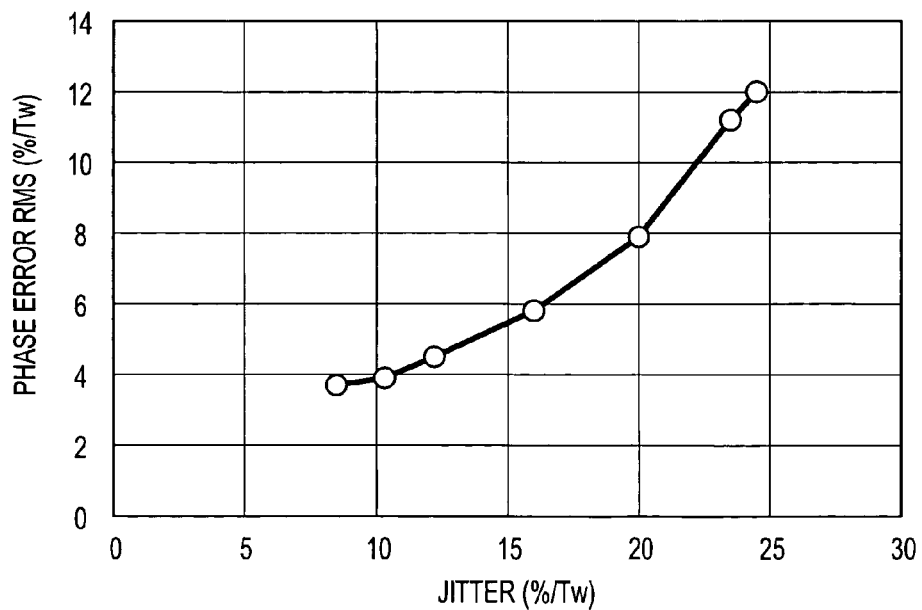
FIG. 8 is a simulation result showing the relationship between PLL input signal jitter and a clock RMS error.
Figure 9:
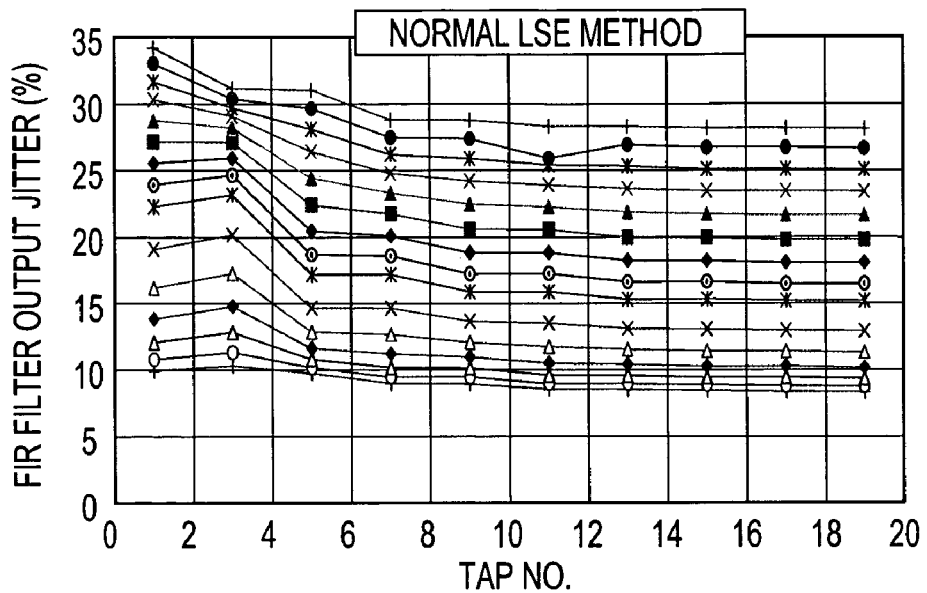
FIG. 9 is a simulation result showing the relationship between a tap number of an FIR filter having odd number of taps and a jitter value of an output signal.
Figure 10:
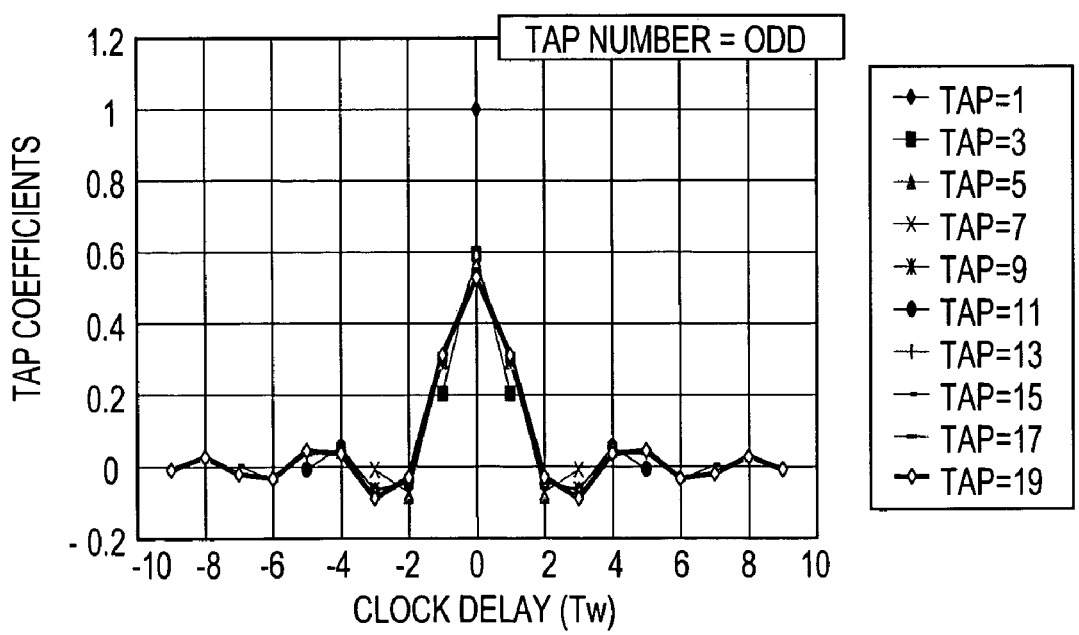
FIG. 10 is a simulation result showing tap coefficients of the FIR filter having the odd number of taps.
Figure 11:
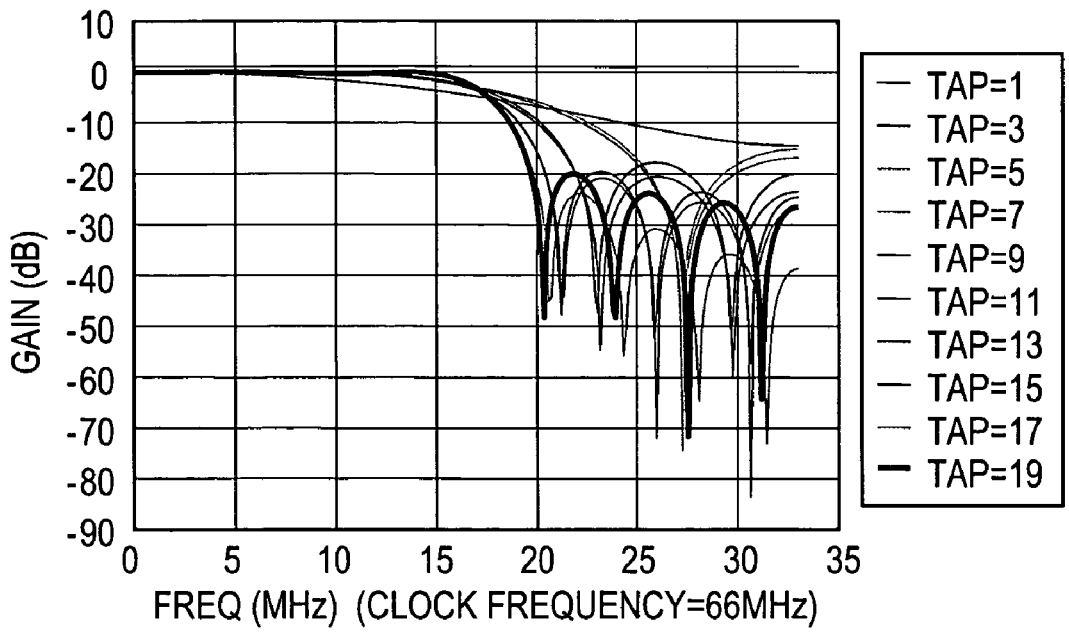
FIG. 11 is a simulation result showing frequency characteristics of the FIR filter having the odd number of taps.

FIG. 1 shows the construction of a circuit for decoding a readout signal, according to the present invention. An RF input 50 detected by an unillustrated optical head is subjected to equalizing processing and AGC processing at an analog equalizer 10, then inputted to a digital signal processor 20. In the digital signal processor 20, the input RF signal is converted to a digital signal by an AD converter 21 at every clock and thereafter subjected to DC correction by a slicer 22. Then, the so-processed signal is digital-equalized by an FIR filter 23 and binarized by a Viterbi decoder 40, which in turn is taken out as a binary output 51. An internal construction of the Viterbi decoder 40 is intended to compare the readout signal with a target signal generated by convolutions of bit stream and the PR class, then select a bit string at which an error reaches a minimum and bring it into binarization. The above-described process of studying the tap coefficients of the FIR filter is carried out by an LSE control 24. A PLL (Phase Locked Loop) circuit 30 that generates a clock 52 comprises two phase detectors PD1 and PD2 (denoted at 31 and 32 respectively), a selector 35, a low-pass filter 33, a VCO (Voltage Controlled Oscillator) 34, and a lock monitor 30. The present construction is characterized in that the phase detectors 31 and 32 are respectively provided with respect to two signals subsequent to the AD converter 21 and the FIR filter 23 and selectively used by the selector 35. This reason will be explained next.

A description has already been made of the case in which the quality of the readout signal can be improved by the FIR filter 23. A response delay from the AD conversion to the control of the VCO 34 based on the result of detection of each phase by the phase detector 31 is assumed to be t1. Also a response delay from the AD conversion to the phase error detection from the readout signal which was equalized by using the FIR filter 23 and the reflection thereof on the clock 52 under the control of the VCO 34 by the phase detector 31 is assumed to be t2. There is a high possibility that since t2 is relatively larger than t1 as is apparent even from the construction of FIG. 1, a pull-in failure will take place upon the use of the phase detector 32 where a response speed of a PLL is important as in clock pull-in processing or the like. The present construction is characterized in that when the response speed is important in this way, the VCO is controlled using the phase detector 31 corresponding to the shortest path, whereas when the stability is important as in the case of a steady operation subsequent to the clock pull-in, the selector 35 is switched so as to use the phase detector 32. Control on the selector 35 can be done by an external CPU 140 according to a mode select 54. It is also important that consideration is taken in such a manner that in order to adapt to an inability to allow the CPU 140 to cope with defects or the like on the disk, the lock monitor 36 which monitors the RMS value of the phase error and thereby automatically generates a mode select signal 54 to control the operation of the selector 35.

FIG. 19 shows a phase detecting method used in a phase detector. Phase error can be detected by treating the level (shift from a zero point) of the edge as a quantity equivalent to a phase error whether the sampling points (clock) are on the edges of the readout signal or shifted by ½ clock as shown in the figure. Either construction may be adopted for the phase detectors PD1 and PD2 shown in FIG. 1.

Figure 20:
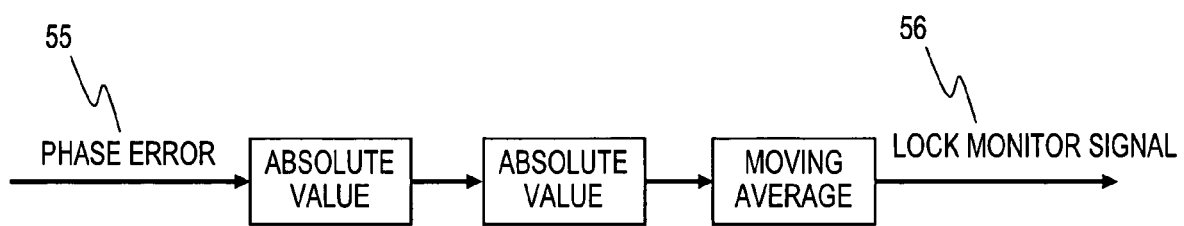
FIG. 20 shows a method for detecting a PLL lock state of a PLL lock monitor.

FIG. 20 is an embodiment showing a method for detecting the lock state using the PLL lock monitor under the construction of FIG. 1. Using the RMS value of the phase error is effective as the method for measuring the stability of the PLL as described above. However, the calculation of a square value or the like is needed upon the process of calculating the RMS value, increases in circuit scale and power consumption present a problem. Thus, the present embodiment has shown the method for calculating the absolute values of phase errors and thereafter taking a mean value thereof in place of the calculation of the RMS value. While a high-speed multiplier is necessary for the calculation of the square value, a sign bit is forcibly set so as to show a positive value upon the calculation of each absolute value, whereby the absolute value can simply be obtained. While the averaging processing shown here depends on a moving average of 256 samples, a similar value can be calculated even though an IIR filter is used. Owing to such a construction as shown in the figure, a lock monitor signal 56 can be obtained from a phase error 55. A circuit for generating the PLL lock monitor signal under the present construction can be built in as part of the low-pass filter 33 shown in FIG. 1. When the output of the low-pass filter for control of the VCO is averaged to simplify the construction at this time, the output of the low-pass filter for control of the VCO reaches a value near zero (or average value) where the phase error greatly fluctuates in positive and negative form, so that the lock state cannot properly be monitored. It is important that the averaging process is done after conversion into the absolute value strictly.

Figure 21:
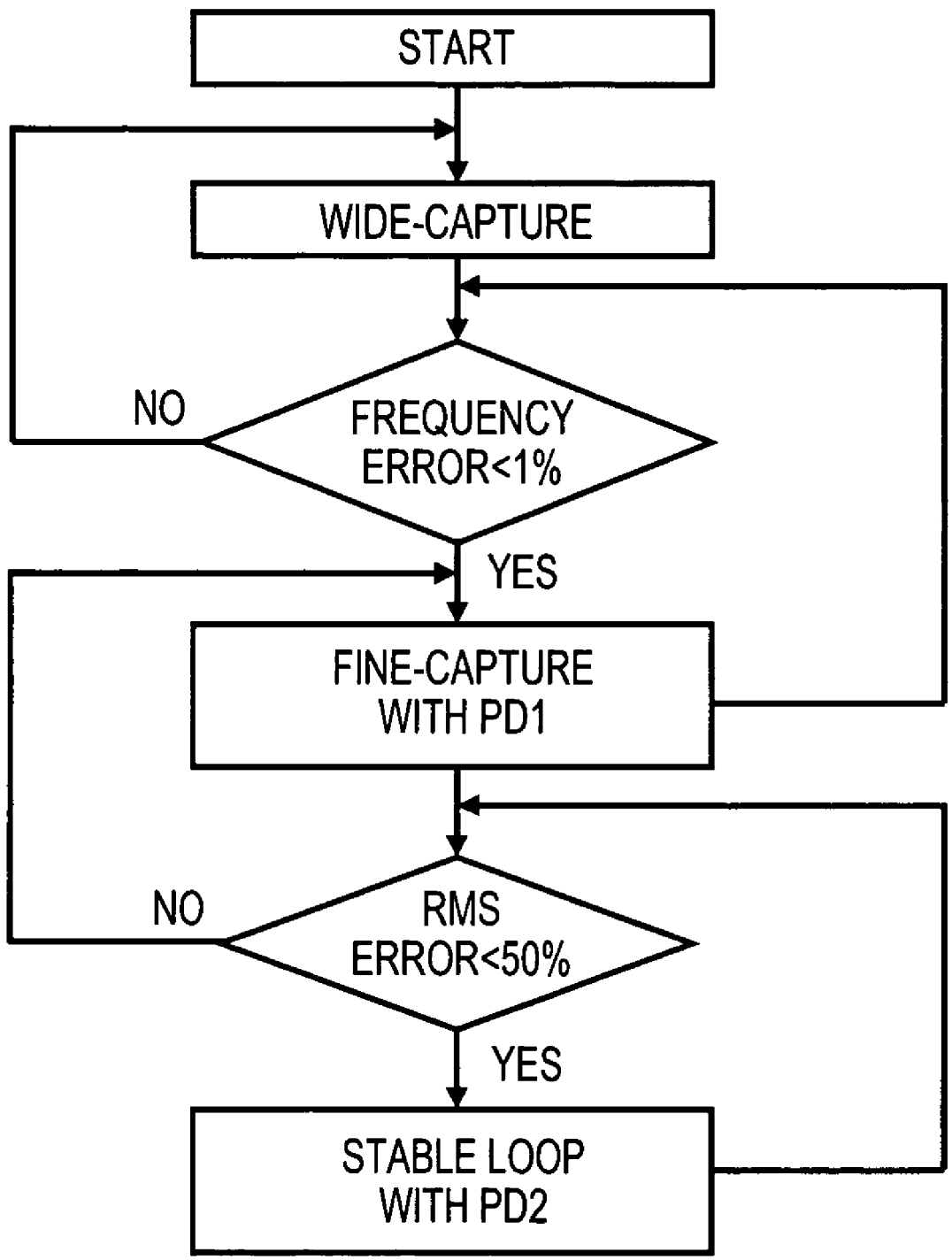
FIG. 21 illustrates a switch sequence of the phase detector.

FIG. 21 shows a sequence for the process of automatically selecting either of the phase detectors to be used by the lock monitor 36. In the pull-in process of the PLL, the wide capture unit unillustrated in FIG. 1 generally performs the control of the VCO up to a frequency error of approximately 1% or so. Thereafter, the PLL proceeds to the process of detecting a phase error of the readout signal and feeding back it to the VCO. The figure shows a sequence at the PLL pull-in in which the wide capture processing has been taken into account. Basically, it is possible to achieve both stable pull-in operation of the PLL and a steady operation thereof if the mode is switched according to the lock monitor output. Although the processing at the pull-in has been illustrated here, the PLL can be reset to a stable state using the sequence shown in the present figure even when the operation of the PLL becomes instable due to defects or the like.

Third Embodiment

Optical Disk Apparatus

Figure 22:
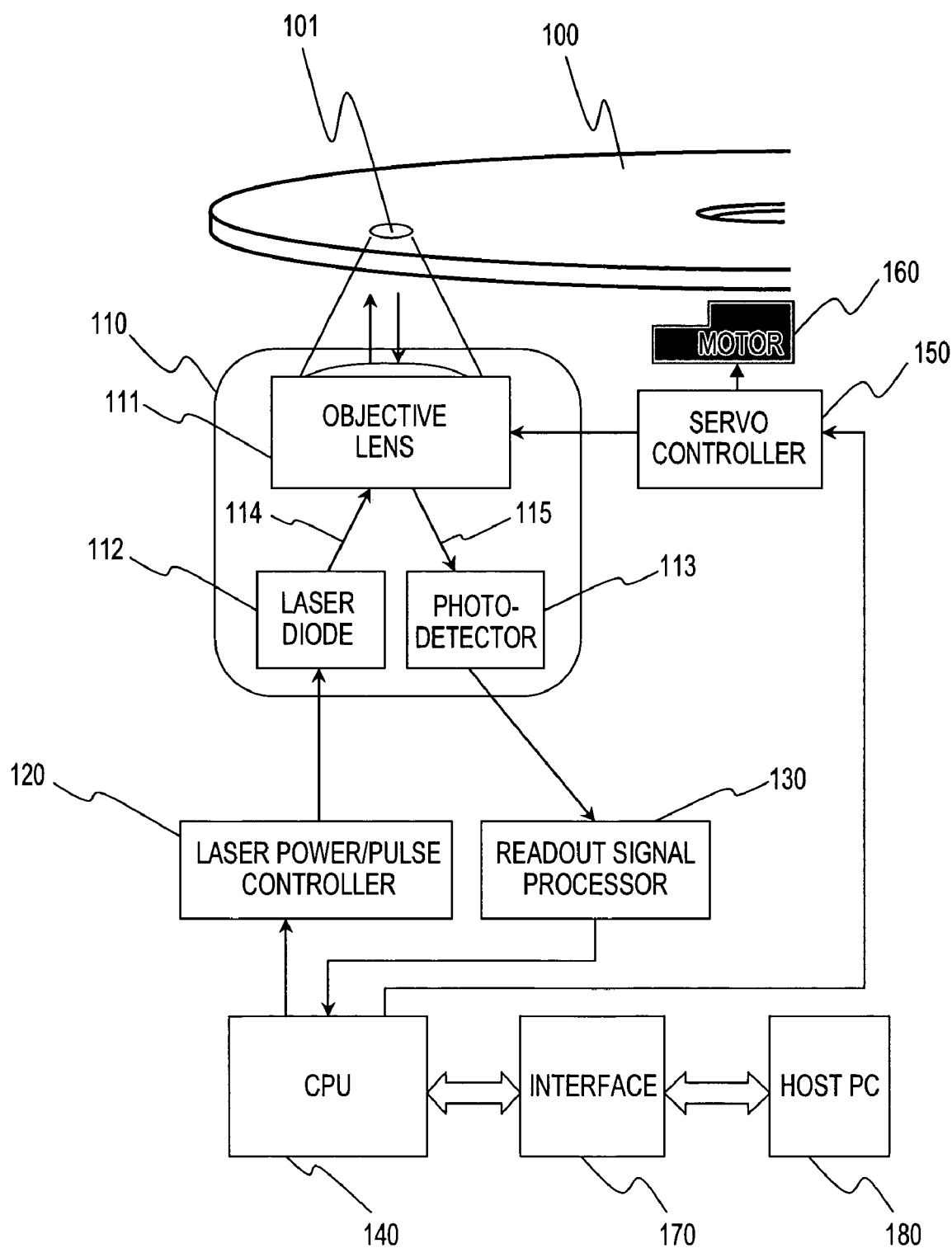
FIG. 22 illustrates the construction of an embodiment of an optical disk apparatus of the present invention.

FIG. 22 is an embodiment showing the construction of an optical disk apparatus of the present invention. An optical disk medium 100 is rotated by a motor 160. Upon reproduction, a laser power/pulse controller 120 controls a current fed through a laser diode 112 lying in an optical head 110 so as to reach a light intensity instructed by a CPU 140, thereby generating laser light 114. The laser light 114 is focused by an objective lens 111 so that an optical spot 101 is formed on the optical disk medium 100. The light 115 reflected from the optical spot 101 is detected by a photo-detector 113 through the objective lens 111. The photo-detector comprises photo-detecting elements divided into plural form. A readout signal processor 130 reproduces information recorded onto the optical disk medium 100 using a signal detected by the optical head 110. Upon recording, the laser power/pulse controller 120 converts predetermined recording data into a predetermined recording pulse current and controls pulse light in such a manner that it is emitted from the laser diode 112. The readout signal decoding circuit of the present invention shown in FIG. 1 is built in the readout signal processor 130. With such a construction, an optical disk apparatus can be realized which stabilizes the operation of a PLL and has satisfactory readout performance. Incidentally, the present apparatus is a multidrive capable of recording or reproducing a plurality of mediums such as a CD, a DVD, and a BD.

The present invention is used in a large-capacity optical disk apparatus.

What is claimed is:

1. An optical disk apparatus including an analog equalizer that receives a Radio Frequency (RF) signal from an optical head, and a Viterbi decoder that outputs a binary signal based on said RF signal, comprising:
   an Analog-to-Digital Converter (ADC) that converts said RF signal to a digital signal;
   a digital filter that receives said digital signal; and
   a digital Phase Locked Loop (PLL) circuit; wherein said PLL circuit comprising at least two phase detectors;
   a lock monitor;
   a selector connected to said at least two phase detectors and connected to said lock monitor, wherein said selector selects one of said at least two phase detectors according to an output of said lock monitor;
   a Low-Pass Filter (LPF) connected to said lock monitor and said selector; and
   a Voltage Controlled Oscillator (VCO) connected to said Low-Pass Filter (LPF);
   wherein one of said at least two phase detectors receives a signal that has passed through said digital filter, and another of said at least two phase detectors receives a signal that has not passed through said digital filter.

2. The optical disk apparatus according to claim 1,
   wherein said selector includes a function of automatically selecting a suitable one of said phase detectors according to an operating condition of said PLL circuit.

3. The optical disk apparatus according to claim 1,
   wherein said lock monitor monitors a Root Mean Square (RMS) value of a phase error.

4. The optical disk apparatus according to claim 1,
   wherein said lock monitor outputs a lock monitor signal from a signal indicative of a phase error; and wherein said lock monitor signal is calculated by taking an average value of an absolute value of said phase error.

5. The optical disk apparatus according to claim 1, further comprising:
a slicer which performs a Direct Current (DC) correction on said digitized signal output from said Analog-to-Digital Converter (ADC).

6. A digital Phase Locked Loop (PLL) circuit that extracts a clock signal from a readout signal, and that is implemented in a circuit including a digital filter, comprising:
a plurality of phase detectors;
a lock monitor;
a selector connected to said plurality of phase detectors and connected to said lock monitor, wherein said selector selects one of said plurality of phase detectors according to an output of said lock monitor;
a Low-Pass Filter (LPF) connected to said lock monitor and said selector; and
a Voltage Controlled Oscillator (VCO) connected to said Low-Pass Filter (LPF);
wherein one of said plurality of phase detectors receives a signal that has not passed through said digital filter, and another of said plurality of phase detectors receives a signal that has passed through said digital filter.

7. The PLL circuit according to claim 6, wherein said selector includes a function of automatically selecting a suitable one of said phase detectors according to an operating condition of said PLL circuit.

8. The optical disk apparatus according to claim 2, wherein said operating condition of said PLL circuit comprises a quality of a readout signal of said digital filter.

9. The PLL circuit according to claim 7, wherein said operating condition of said PLL circuit comprises a quality of a readout signal of said digital filter.

* * * * *